(No Model.)
B. O. FOSTER.
SUSPENDERS.
No. 399,514. Patented Mar. 12, 1889.
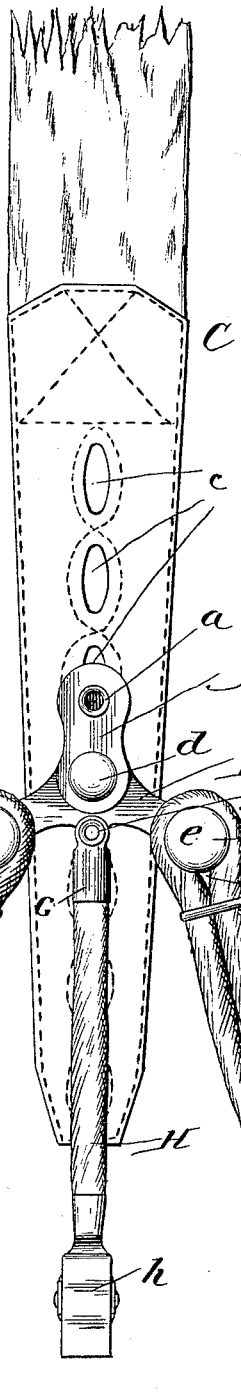

United States Patent Office.

BENJAMIN O. FOSTER, OF HUMBOLDT PARK, ILLINOIS.

SUSPENDERS.

SPECIFICATION forming part of Letters Patent No. 399,514, dated March 12, 1889.

Application filed December 8, 1888. Serial No. 293,047. (No model.)

*To all whom it may concern:*

Be it known that I, BENJAMIN O. FOSTER, a citizen of the United States, residing at Humboldt Park, in the county of Cook and State of Illinois, have invented a certain new and useful Improvement in Attachments for Adjusting Suspender-Ends; and I do hereby declare that the following is a full, clear, and exact description of the invention, which will enable others skilled in the art to which it pertains to make and use the same, reference being had to the accompanying drawings, forming a part hereof, in which—

Figure 1 is a front elevation showing the suspender-end attached to the suspender. Fig. 2 is a rear view of the connecting-link and strap-bar. Fig. 3 is a longitudinal section on the central line of Fig. 1.

The object of this invention is to furnish a ready means for the attachment and detachment of suspender-ends, dispensing with the use of buckles, which have heretofore been used for this purpose, and have the attachment one that can be easily operated, and by which the suspender-ends can be adjusted readily and quickly, as required for use, and its nature consists in providing a link having a stud for attachment to the suspender, and to which link is secured the attaching device for the suspender-ends, and in providing the ends of the suspender with a series of holes to receive the stud of the link and permit the adjustment of the suspender-end, as hereinafter more specifically described, and pointed out in the claim.

In the drawings, A represents the link, made of any suitable metal or material.

B is the stud, having a shank or stem, $a$, and a head or button, $b$, and firmly attached to the end of the link A by the shank or stem $a$, so as to leave a space between the face of the link and the face of the head or button $b$.

C is the suspender, the end of which is provided with a series of holes, $c$, of a length sufficient for the passage of the head or button $b$. This end of the suspender can be a separate piece made of leather, webbing, or other suitable material attached to the suspender, and having the holes $c$ therein, or the holes can be made in the suspender itself.

D is a bar pivotally attached to the end of the link A by a pin or pivot, $d$, so that the bar is free to turn or swing.

E are studs—one for each end of the bar D—each having a head, $e$.

F are the straps—one for each stud E—each strap having at its upper end a loop or hole, $f$, to receive the stud E, and at its lower end a loop or hole, $f'$, for the button on the pants.

G is a pendant, attached by a pin or pivot, $g$, to the bar D at the center.

H is a strap secured to the pendant G, and having at its lower end a clamp, $h$, for attachment to drawers, as usual.

The parts D E F G H constitute the suspender-end to be attached to the suspender by the link A and stud B, with the holes $c$; but instead of the suspender-end shown and described other forms of suspender-ends can be used secured to the link A, and attached to the suspender by the link A and its stud B.

The suspender-end is attached to the suspender by slipping the stud B in such hole $c$ as will give the proper length, and the suspender can be shortened by placing the stud in a higher hole $c$, and can be lengthened by placing the stud in a lower hole $c$, to do which all that is necessary to be done is to slip the stud B from the hole $c$ and insert it in such upper or lower hole as is required for the proper adjustment.

The suspender-end for the back can be secured to a link, A, having a stud, B, and such stud inserted in a hole made in the back end of the suspender, by which means both ends of the suspender will be attached by links A, having studs B.

The stud B can be readily inserted and withdrawn from the holes $c$, and will not become corroded by perspiration, so as to be inoperative, as do the buckles or clasps now used for attaching suspender-ends, and when inserted a free movement of the link is had, permitting the suspender-end to adjust itself in position.

The link A and stud B present, when in place, a neat and finished appearance, and one which is not large and cumbersome, and at the same time a strong and firm attachment is had for the suspender-ends, which cannot be detached readily, and which will connect the suspender to the suspender-end and maintain the connection under all circumstances.

The head $b$ of the button is round and smooth and does not project, so as to be inconvenient to the wearer of the suspenders, and the smooth surface can be in contact with the apparel without any danger of tearing the material, and by using the stud B all sharp corners and edges found in buckles and hooks are avoided and the objections thereto obviated and overcome.

What I claim as new, and desire to secure by Letters Patent, is—

The pivoted link A and stud B, in combination with the bar D, a suspender-end, and a suspender for attaching the suspender-end to the suspender, the latter provided with means for attaching the stud thereto, substantially as specified.

BENJAMIN O. FOSTER.

Witnesses:
O. W. BOND,
M. L. PRICE.